S. VOLZ.
APPARATUS FOR PASTEURIZING BOTTLED LIQUIDS.
APPLICATION FILED AUG. 6, 1908.

1,226,726.

Patented May 22, 1917.
3 SHEETS—SHEET 1.

WITNESSES.

INVENTOR.
Simon Volz
By Benedict, Morsell & Caldwell
ATTORNEYS.

UNITED STATES PATENT OFFICE.

SIMON VOLZ, OF MILWAUKEE, WISCONSIN, ASSIGNOR TO THE TWENTIETH CENTURY MACHINERY COMPANY, OF MILWAUKEE, WISCONSIN, A CORPORATION OF ILLINOIS.

APPARATUS FOR PASTEURIZING BOTTLED LIQUIDS.

1,226,726.  Specification of Letters Patent.  Patented May 22, 1917.

Application filed August 6, 1908. Serial No. 447,226.

*To all whom it may concern:*

Be it known that I, SIMON VOLZ, a citizen of the United States, residing in Milwaukee, in the county of Milwaukee and State of Wisconsin, have invented new and useful Improvements in Apparatus for Pasteurizing Bottled Liquids, of which the following is a description, reference being had to the accompanying drawings, which are a part of this specification.

My invention has relation to an improved apparatus for pasteurizing bottled liquids.

The primary object of the invention is to provide an improved apparatus, whereby the water or the pasteurizing agent in which the bottles are sterilized is gradually heated to a uniform heat the highest temperature of the pasteurizing agent being maintained at a point intermediate of the initial and final contact of the liquid containing receptacles therewith, thereby avoiding the danger of breaking the bottles, and also preventing the beer, or other liquids, from having a burnt or disagreeable taste, or being otherwise deleteriously affected, which is the case in processes and apparatuses wherein this gradual heating is not present, the pasteurizing in the case of my invention being carried out in a minimum of time, and in a manner to secure the most effective pasteurizing results.

A further object contemplated by my invention is the provision of an apparatus for moving the receptacles containing the liquid intermittently through the pasteurizing agent, to accomplish the improved results hereinafter set forth.

With the above primary, and other incidental, objects in view, the invention consists of the apparatus and its several parts, and combinations of parts, as hereinafter set forth.

In the accompanying drawings.

Referring to the drawings, the numeral 8, indicates a pasteurizing tank. This tank is closed throughout, excepting that its top is provided near the forward end thereof and parallel with and adjacent to its lateral edges, with elongated openings 9, 9, said openings being of sufficient width to admit of the passage therethrough of the bottle carriers hereinafter referred to.

Figure 6:
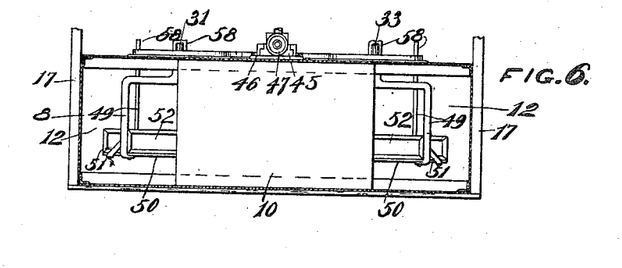
Fig. 6 is a cross section on the line 6—6 of Fig. 5.
Figure 7:
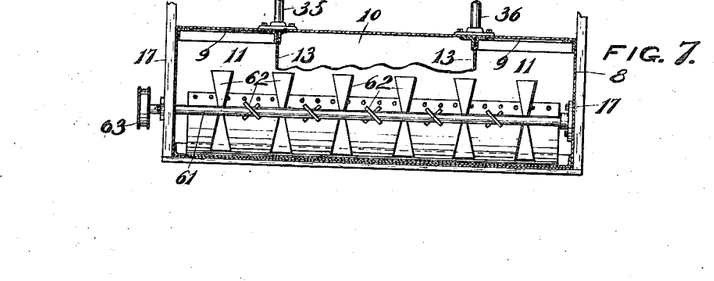
Fig. 7 is a cross section on the line 7—7 of Fig. 5 looking toward the left with part broken away.

Near opposite ends of the tank are located interior transverse partitions 10, 10, said partitions extending from the bottom to the top of the tank, but terminating short of the sides of the tank so as to leave forward openings or spaces 11, 11 (see Fig. 7) and rear openings or spaces 12, 12 (see Fig. 6).

Longitudinally extending partitions 13, 13 are also arranged within the tank, and these partitions are of such length that their ends join the transverse partitions 10, 10. The said longitudinal partitions divide the tank into three compartments, designated, respectively, by the numerals 14, 15 and 16.

Connected to the opposite sides of the tank and extending a desired distance above the top of said tank are a series of beams 17, which, for the purpose of strength, are preferably U-shaped in cross section. These beams not only serve to brace the sides of the tank and prevent the bulging out thereof, but also serve as a support for mechanism located above the tank. Each set of opposite beams 17 support at their upper ends transverse channeled beams 18. The two rear transverse beams 18 are connected by three longitudinal beams 19, 19' and 19''. Journaled in suitable bearings in the said three beams is a transverse driving shaft 20. This shaft carries thereon loose and fast pulleys 21 and 22 respectively, around which a belt (not shown) leading from any suitable source of power, is adapted to pass. Fast on shaft 20 is a pinion 23 which is adapted to mesh with a larger toothed wheel 24 mounted on a second transverse shaft 25, said second transverse shaft being mounted in bearings in the longitudinal beams 19' and 19''. Shaft 25 has fast thereon a pinion 26 which meshes with a large toothed wheel 27 mounted on a short transverse shaft 28, which latter shaft is also mounted in bearings on the longitudinal beams 19' 19''. Shaft 28 carries a mutilated gear 29, which is adapted to intermittently engage a worm gear 30 carried at the upper end of a vertical shaft 31, the lower end of said vertical shaft being mounted in a bearing formed on the top of the tank, and also in a bearing carried by the transverse beam 18 at the rear end of the machine. Just above its lower end the shaft 31 carries a sprocket wheel 32. There is also at the rear end of the machine another vertical shaft 33 which carries a sprocket wheel 34, said shaft having a bearing at its lower end in the top of the tank, and a bearing at its upper end in the rear transverse beam 18. There are, furthermore, two corresponding vertical shafts designated, respectively, by the numerals 35 and 36 at the forward portion of the machine, the lower ends of said shafts likewise having their bearings in the top of the tank, and their upper ends in the forward transverse beam 18. These shafts carry respectively sprocket wheels 37 and 38.

Supported below the transverse beams 18 is a serpentine trackway. The support for this trackway may be of any desired form, but I prefer to provide the particular construction shown in the drawings, a description of which will now be given. Secured to and depending from each of the several transverse beams 18, are hangers or arms 39. These arms are arranged in pairs, the two arms of each pair being parallel and equidistant apart.

Figures 3, 4:
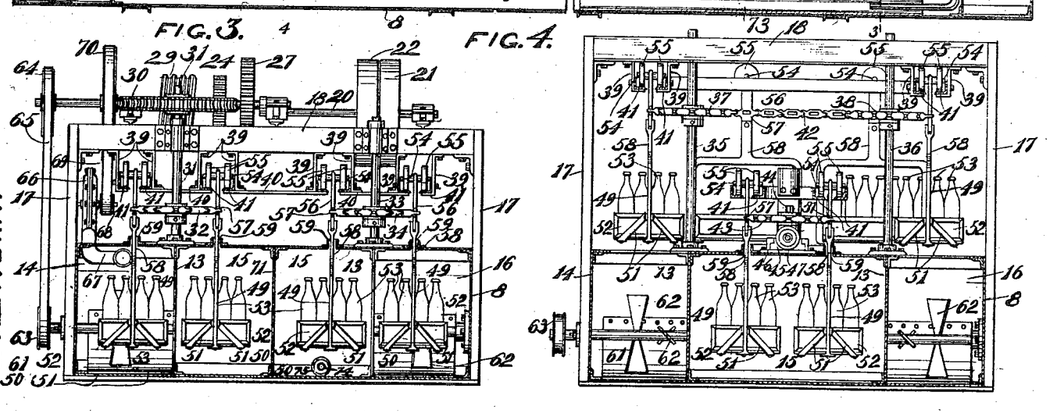
Fig. 3 is a cross section on the line 3—3 of Fig. 1, looking toward the left.
Fig. 4 is a cross section on the line 4—4 of Fig. 1 looking toward the left.
Figure 5:
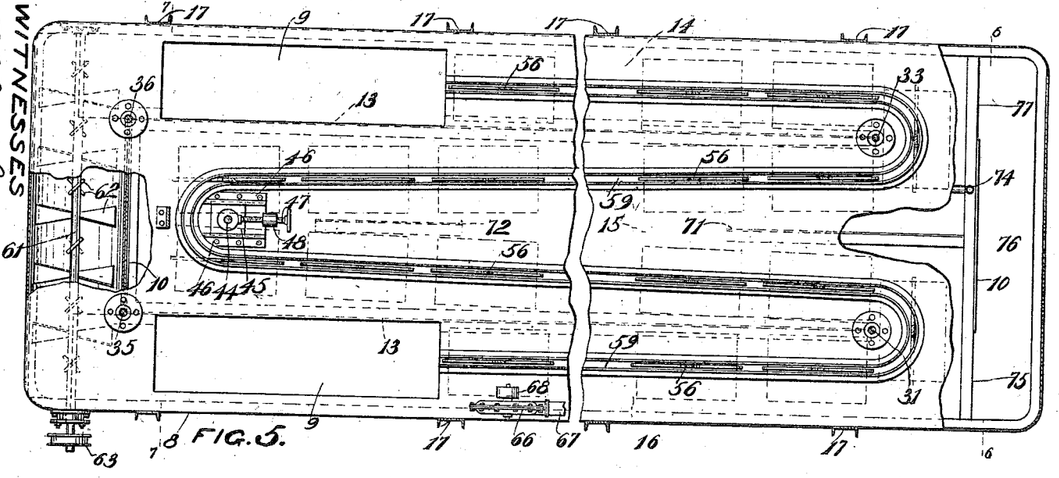
Fig. 5 is a plan view of the tank, parts broken away to show interior construction.

Each of the transverse beams, with the exception of the extreme forward beam, has eight of these hangers depending therefrom, while the extreme forward transverse beam has only four of said hangers depending therefrom. Fig. 3 shows the eight depending hangers, and Fig. 4 the four depending hangers relating to the extreme forward transverse beam. In the case of the depending hangers, with the exception of those depending from the forward transverse beam, the lower ends of said hangers, excluding the extreme outer hangers, are connected by horizontal connecting arms 40 which extend laterally beyond the ends of the respective vertical hangers which they connect, and thereby not only serve to prevent spreading apart of the hangers, but also form lateral outstanding feet for the support of the rails forming the trackway. The extreme outer hangers of the transverse beams 18 just referred to are free from connection with the horizontal arms 40. Their lower ends, however, are bent inwardly at right angles (as most clearly shown in Fig. 3) to form supports for the rails connected thereto. In the case of the four hangers 39 depending from the forward transverse beam 18, the lower ends of the hangers of each pair are bent inwardly toward each other to form supporting feet for the rails.

The track is composed of rails 41, preferably of angle iron form. These rails are supported by the inwardly turned feet at the lower ends of the depending hangers of the forward transverse beam 18 (see Fig. 4) and by the projecting ends of the horizontal connecting arms 40 and by the inwardly turned ends of the outer hangers depending from the transverse beams 18 other than the forward beam (see Fig. 3).

It will be noticed that the upwardly extending beams 17 at the forward end of the machine extend upwardly a greater distance than any of the succeeding beams. This necessarily increases the height of the forward transverse beam 18, and consequently the trackway suspended by the hangers 39 of said forward transverse beam is on a higher plane at this point, being in fact on a level for a short distance rearwardly. From the rear terminus of the level portion, the track is on a decline until such lower point is reached as will permit of the rails being supported by the hangers 39 depending from the transverse beams 18 which are carried at the upper ends of the short vertical beams 17.

Following the course of the serpentine trackway from its level forward point, such track-way descends to a point where it is supported by the hangers depending from the transverse beams supported at the upper ends of the short vertical beams 17, as just explained. It then continues on a horizontal plane along one side, thence circles around the rear sprocket wheel 34, thence continues from the rear forwardly in a horizontal plane, thence makes a turn just to the rear of the forward transverse beam 18, thence continues from this turn rearwardly in a horizontal plane and circles around the sprocket wheel 32, thence continues forwardly along the opposite side and on a horizontal plane for a distance somewhat greater than one-half the length of this side of the machine, thence upwardly at an incline corresponding to the initial inclination already referred to, thence around on a horizontal plane to the starting point.

A sprocket chain 42 is driven by the sprocket wheel 32 carried on the vertical shaft 31. Following the course of this chain after it leaves the sprocket wheel 32, it extends forwardly in one medial length to and around a sprocket wheel 43 carried on a short stud or spindle 44, thence rearwardly in a second medial length to and around the other rear sprocket wheel 34, thence forwardly and around the forward sprocket wheel 38, thence along the forward end of the machine in a transverse direction and around the other forward sprocket wheel 37, thence along the other side and longitudinally to join the initial starting point of the chain, i. e., at the rear sprocket wheel 32.

It is desirable that means be employed for tightening the sprocket chain, and for this purpose I mount the spindle 44 of the sprocket wheel 43 in a box 45 which box is slidable in guide ways 46, 46. The box is moved forwardly or rearwardly by means of a screw 47, revolubly connected at its forward end to the box and passing through a threaded opening in an upwardly extending bearing lug 48. The rear end of the screw is advisably provided with a hand wheel, for convenience in turning the same. It is obvious that when the screw is turned in one direction, it will move the bearing box 45 forwardly and thereby tighten the chain, and consequently take up slack.

The frames which support the bottle crates each consist of a U-shaped structure 49, the depending arms thereof at their lower ends being bent inwardly to form feet to which is riveted a plate 50. In order to prevent the plate from tilting sidewise, diagonal arms 51, 51 extend from the depending arms of the frame and these diagonal arms are likewise formed at their lower ends with inwardly extending feet to which the plate 50 is riveted. The frames 49 are adapted to support a rectangular bottle crate 52, and each plate 50 forms the bottom of each crate, the bottles 53 resting on said bottoms and being supported thereby.

Each carriage consists of an axle 54 upon which are mounted wheels 55, 55, said wheels adapted to ride on the rails 41. Depending centrally from each axle 54 is an arm 56. Each of these arms is connected to the sprocket chain 42, and therefore forms a part of said chain, each arm being formed with an opening 57 into which the teeth of the several sprocket wheels are adapted to engage, the said opening being in alinement with the elongated openings of the links of the sprocket chain (as most clearly shown in Fig. 4). The arms 56 extend slightly below the sprocket chain 42, and are pivoted between the furcate members of the bifurcated end of an arm 58 extending upwardly from the center of each U-shaped frame 49, said arm 58 being preferably integral with the said frame. It will be understood that the frames 49 and the bottle crates carried thereby are within the tank 8, and that the upwardly extending arms 58 are adapted to pass through and travel in a serpentine slot 59 formed in the top of the tank.

If no means were provided to guard against it, the sprocket chain 42 in its movement from the forward level plane down the incline would have a tendency at the lower end of said incline to jump upwardly. The same would also be true in regard to the final movement of the machine on the opposite side, where the chain moves upwardly at an incline. To guard against this tendency short auxiliary inverted U-shaped rails 60 are employed on opposite sides of the machine at the terminus of the decline. The wheels 55 of the carriers are adapted to pass beneath these rails, and consequently said rails prevent any up movement of the carriers, as just referred to.

Extending transversely of the forward portion of the tank, in advance of the partition 10, is a shaft 61, said shaft having a series of blades 62 radiating therefrom. This shaft and its blades form a circulating pump. One end of shaft 61 is extended through one side of the tank, and carries thereon a belt pulley 63, said belt pulley connected up to another pulley 64 on the outer end of the driving shaft 20 by means of an endless belt 65. It is obvious that when the drive shaft 20 is rotated rotation is conveyed to shaft 61 through the medium of the belt and pulleys just referred to.

Above that side of the tank from which the bottles finally emerge from within the tank is a fan 66, said fan having a pipe 67 extending downwardly therefrom and entering the chamber 16 of the tank. One end of the shaft of this fan is extended and carries a pulley 68. Around this pulley passes an endless belt 69, said belt also extending around a larger pulley 70 mounted on shaft 20. Through this medium the rotation of the drive shaft 20 is conveyed to the fan shaft.

Short longitudinal partitions 71 and 72 are disposed within the central compartment 15 of the tank. Partition 71 extends inwardly from the rear transverse partition 10 for a desired distance, and partition 72 starts at a point just to the rear of sprocket wheel 43 and rearwardly for a desired distance. The inner ends of the two partitions 71 and 72, however, do not meet but are a considerable distance apart.

Within that portion of the tank between the rear partition 71 and the right hand partition 13 (Fig. 3) is a siphon injector, consisting of a tube 73 arranged at the bottom of the tank and extending from a point just in advance of the rear partition inwardly for a desired distance, and a steam pipe 74 leading from any suitable source of steam supply and extending through the top of the tank and downwardly and thence bent horizontally and extended into the rear end of the tube 73 for a short distance.

In the use of the apparatus, the source of steam supply to the pipe 74 is turned on. The steam issues out of the lower end of said pipe into the tube 73, and thence passes into the central compartment 15 of the tank. This siphon injector, therefore, is the means provided for keeping the water in the tank in a heated condition, and as this injector discharges into the central compartment 15, the water in this compartment is naturally maintained at a higher temperature than in the other compartments of the tank.

Figure 1:
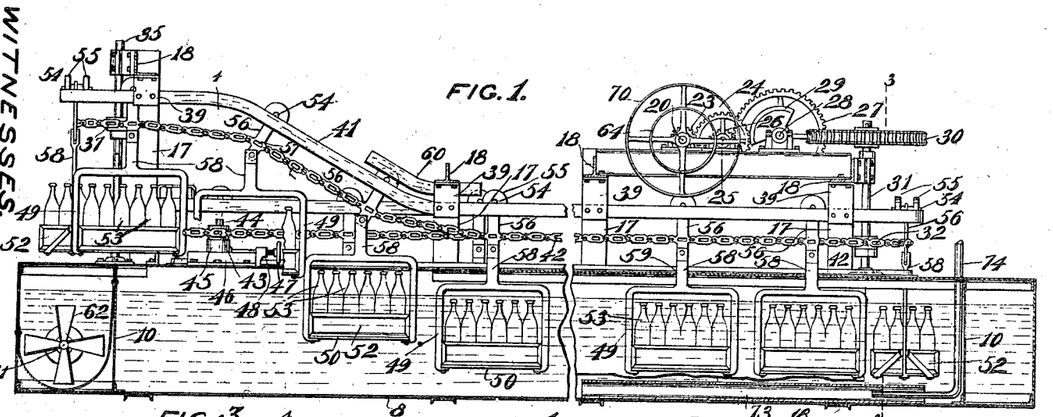
Figure 1 is a longitudinal vertical sectional view on the line 1—1 of Fig. 2.
Figure 2:
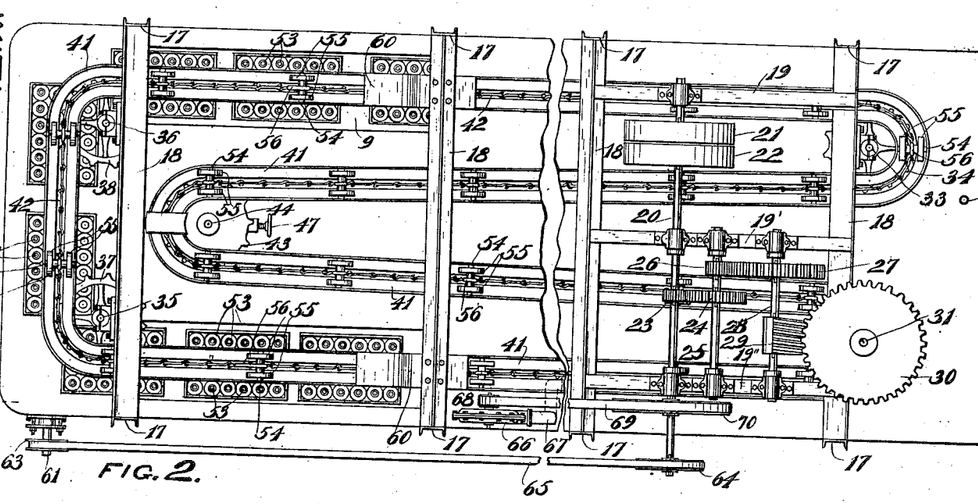
Fig. 2 is a plan view, part broken away.

The bottles containing the beer, or other liquid, are corked as usual and placed on the bottom of the crates 52. The crates so filled with the bottles to be sterilized are now placed in the cages or frames 49 which are at the forward level portion of the apparatus, the bottoms of the crates resting on the bottoms of the cages or frames. Power is now applied to the driving shaft 20, and the endless sprocket chain 42, as well as the other moving portions of the apparatus, are thus put into operation. As the endless chain moves, the first advancing carrier or carriage with its depending cage and bottle crate carried by said cage descend the initial incline and pass through the opening 9 in the top of the tank on the initial side of the mechanism, so as to lower the cage and crate into the compartment 14 of the tank. The perpendicular position of the cage and its crate is maintained during the descent of the carrier down the incline by reason of the pivotal connection between the arms 56 and 58, as clearly shown in Fig. 1. It will be evident that the movement of the advancing carrier, as well as all succeeding carriers, is intermittent, by reason of the provision of the mutilated gear 29 which only engages the worm gear during a portion of its rotation. Each cage and its bottle crate, therefore, are first lowered into the compartment 14 of the tank, and at the terminus of the decline continues its travel along said compartment 14 rearwardly and on a level plane. Each cage and crate with the bottles is carried to the extreme rear end of the compartment 14, and then around the rear end of partition 13, entering the central compartment 15. In this compartment the cage and its crate travel forwardly, circling around the shaft 44, and thence travel rearwardly to the rear end of the compartment 15, and backward and forward travel in said compartment 15 also being on a level plane. The cage and its crate next pass around the rear end of the other partition 13, and thence forwardly in compartment 16 on a level plane until the carrier reaches the inclined portion of the trackway. In traveling up this inclined portion of the trackway, the cage and crate are lifted upwardly and through the opening 9 out of the tank, finally traveling to the starting point, or the forward level portion of the apparatus, at which point the crate containing the pasteurized bottles is removed from its cage and another crate containing bottles to be pasteurized substituted therefor.

The bottles when first placed in their crates are in a cool condition, and hence when they first enter the water in the compartment 14 of the tank have the effect of cooling the water in said compartment. When the bottles reach the central compartment 15 they encounter the hottest water, and hence during their travel back and forth in this compartment are thoroughly sterilized. The bottles on reaching the terminal compartment 16 encounter the cooler body of water, inasmuch as the water in this compartment is cooled by the action of the fan 66. In addition to the water in compartment 16 being cooled by the fan 66 it is also cooled by the action of the circulating pump 61—62, which pump serves to suck the cooled water in the initial compartment 14 out of said compartment through the opening 11 into the forward portion of the tank in advance of the forward transverse partition 10, thence through the other opening 11 and into the terminal compartment 16. The fan of course causes a circulation of air around the tank, and this air becomes gradually warm by absorbing heat units from the warm water. This warm air coming in contact with the bottles as they enter the initial compartment 14, serves to assist in warming said bottles.

The two partitions 71 and 72 in the central compartment 15 act as dams to retard the flow of water therein, and thereby serve to maintain the hottest water which is in said compartment 15 at practically a stand still.

As heretofore stated, the water in the terminal compartment 16 is not only cooled by the action of the fan, but also by the cool water sucked around by the pump. It is important that this cool water should be prevented from passing into the central compartment 15 and thereby cooling the water in said compartment, and which water it is a desideratum to maintain at the highest temperature. The circulation of the water is of course maintained by the pump, and the cooled water which has been drawn from the initial compartment 14 into the terminal compartment 16 is drawn from said latter compartment through an opening 75 between one end of the rear partition 10 and the side of the tank, thence across the rear transverse space 76, thence through an opening 77 between the opposite end of the rear transverse partition 10 and the side of the tank, and thence into the initial compartment 14. Of course the water naturally takes the course just described, inasmuch as said course is the one of least resistance. However, if any of the cooled water should enter the central compartment 15, it will encounter the baffle plate 71 and be thereby deflected out of the compartment 15, and through the opening 75.

From the foregoing description, the construction and operation of the apparatus will be readily understood. In its broad purview, the invention resides in intermittently moving the receptacles containing the liquid through a pasteurizing agent. This intermittent movement of the receptacles results in the following advantage, viz: the stopping and starting of the carriers containing the receptacles to be sterilized, causes a shaking or agitation of the liquid in the receptacles and hence renders the liquid susceptible of more ready pasteurization.

The drawings illustrate a right hand machine. In some instances, it may be desirable to use the machine as a left hand machine. In that event, all that is necessary is to transfer the air fan from the compartment 16 to the compartment 14, and run the circulating pump in a direction opposite to that in which it is run as a right hand machine. The bottles or receptacles under this arrangement first pass into the compartment 16 instead of the compartment 14.

Another advantage possessed by my invention to which I have not heretofore called attention is the fact that the chain carrying the carriages is out of the water during the entire travel of the carriages. In devices wherein the chains are submerged in the water, the said chains deteriorate quite rapidly, the period of time during which they can be used being only about six months. When they thus become impaired, it is necessary to replace them with new chains, which of course involves considerable expense.

What I claim as my invention is:

1. In an apparatus for pasteurizing bottled liquids, the combination of a tank having partitions dividing the interior thereof into longitudinally arranged and parallel compartments communicating with each other in series, each compartment containing a body of a pasteurizing agent, the initial body being warmed or heated, the intermediate body being heated to a higher degree sufficient for sterilizing purposes and the terminal body being cooler, a carrier for holding the liquid containing receptacle, means for moving the carrier through the communicating bodies of the pasteurizing agent without withdrawing the carriers from the agent, and means for maintaining a circulation of the agent around the intermediate body and in a direction to draw the portion of the agent into which the carrier is first submerged to the body from which the carrier finally emerges.

2. In an apparatus for pasteurizing bottled liquids, the combination of a tank having partitions dividing the interior thereof into longitudinally arranged and parallel compartments communicating with each other in series, each compartment containing a body of a pasteurizing agent, the initial body being warmed or heated, the intermediate body being heated to a higher degree sufficient for sterilizing purposes and the terminal body being cooler, a carrier for holding the liquid containing receptacle, means for moving the carrier through the communicating bodies of the pasteurizing agent, and means for maintaining a circulation of the agent around the intermediate body and in a direction to draw the portion of the agent into which the carrier is first submerged to the body from which the carrier finally emerges, means for inclosing the space above the agent in the several compartments to form communicating air-conduits, and means for causing a circulation of air from and through the outer compartments.

3. In an apparatus for pasteurizing bottled liquids, the combination of a tank having partitions dividing the interior thereof into longitudinally arranged and parallel compartments communicating with each other in series and comprising an initial, a terminal and an intermediate compartment, each of which contains a body of a pasteurizing agent, the agent in the initial compartment being warmed or heated, the agent in the intermediate compartment being heated to a higher degree sufficient for sterilizing purposes, and the agent in the terminal body being cooler, a carrier for holding the liquid containing receptacle, means for moving the carrier through the bodies of the agent, the initial and terminal compartments communicating at their ends for circulation of the agent, and means for preventing circulation from the initial and terminal compartments through the intermediate compartment.

4. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one of said openings to the other, a trackway arranged above the tank and taking a serpentine course corresponding to the serpentine course of the slot, carriages traveling on the trackway, cages suspended from the carriages and carrying the liquid containing receptacles, said cages adapted, respectively, to pass through the initial opening of the top of the tank and enter the interior of said tank, and to finally pass out of the terminal opening, the serpentine slot accommodating the connecting medium between the cages and the carriages during the travel of the latter, and means for causing the travel of the carriages along the trackway.

5. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one of said openings to the other, a trackway arranged above the tank and taking a serpentine course corresponding to the serpentine course of the slot, carriages traveling on the trackway, cages suspended from the carriages and carrying the liquid containing receptacles, said cages adapted, respectively, to pass through the initial opening of the top of the tank and enter the interior of the tank, and to finally pass out of the terminal opening, the serpentine slot accommodating the connecting medium between the cages and the carriages during the travel of the latter, and means for causing intermittent travel of the carriages along the trackway.

6. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one opening to the other, a trackway arranged above the tank and taking a serpentine course corresponding to the serpentine course of the slot, carriages traveling on the trackway, cages suspended from the carriages and supporting the liquid containing receptacles, said cages adapted, respectively, to pass through the initial opening of the top of the tank and enter the interior of the tank and to finally pass out of the terminal opening, the serpentine slot accommodating the connecting medium between the cages and the carriages during the travel of the latter, means for causing the travel of the carriages along the trackway, means for heating the body of the pasteurizing agent through which the cages first travel, means for cooling the terminal body of the pasteurizing agent through which the cages finally travel, and means for heating the intermediate body of the pasteurizing agent to a greater extent than the initial body and to a sufficient degree for sterilizing purposes.

7. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one of said openings to the other, a trackway arranged above the tank and taking a serpentine course corresponding to the serpentine course of the slot, carriages traveling on the trackway, cages suspended from the carriages and carrying the liquid containing receptacles, said cages adapted, respectively, to pass through the initial opening of the top of the tank and enter the interior of the tank, and to finally pass out through the terminal opening, the serpentine slot accommodating the connecting medium between the cages and carriages during the travel of the latter, means for causing the travel of the carriages along the trackway, means for heating the body of the pasteurizing agent through which the cages first travel, means for cooling the terminal body of the pasteurizing agent through which the cages finally travel, means for heating the intermediate body of the pasteurizing agent to a greater extent than the initial body and to a sufficient degree for sterilizing purposes, and means for causing a circulation of the pasteurizing agent in a direction to draw said agent from the point where the receptacles are first submerged therein to a point from which the receptacles finally emerge.

8. In an apparatus for pasteurizing bottled liquids, the combination of a closed tank for containing a pasteurizing agent, said tank divided interiorly into a series of communicating compartments, and provided in its top and at the forward portion thereof with elongated openings arranged parallel with the respective side edges of the top, and said top having a serpentine slot leading from one of said openings to the other, a trackway arranged above the tank and taking a serpentine course corresponding to the serpentine course of the slot, carriages adapted to travel on the trackway, cages suspended from the carriages and carrying the liquid containing receptacles, said cages adapted, respectively to pass through the initial opening of the top of the tank and enter the interior of the tank, and to finally pass out through the terminal opening of the top, the serpentine slot accommodating the connecting medium between the cages and the carriages during the travel of the latter, and means for causing the travel of the carriages along the trackway.

9. In an apparatus for pasteurizing bottled liquids, the combination of a closed tank for containing a pasteurizing agent, said tank divided interiorly into a series of communicating compartments, and provided in its top and at the forward portion thereof with elongated openings arranged parallel with the respective side edges of the top, and said top also having a serpentine slot leading from one of said openings to the other, a trackway arranged above the tank and taking a serpentine course corresponding to the serpentine course of the slot, carriages adapted to travel on the trackway, cages suspended from the carriages and carrying the liquid containing receptacles, said cages adapted, respectively, to pass through the initial opening of the top of the tank and enter the interior of said tank, and to finally pass out through the terminal opening of the top, the serpentine slot accommodating the connecting medium between the cages and the carriages during the travel of the latter, means for causing the travel of the carriages along the trackway, and means for introducing steam heat into the intermediate compartment.

10. In an apparatus for pasteurizing bottled liquids, the combination of a closed tank for containing a pasteurizing agent, said tank divided interiorly into a series of communicating compartments and provided in its top and at the forward portion thereof with elongated openings arranged parallel with the respective side edges of the top, and said top also having a serpentine slot leading from one of said openings to the other, a trackway arranged above the tank and taking a serpentine course corresponding to the serpentine course of the slot, carriages adapted to travel on the trackway, cages suspended from the carriages and carrying the liquid containing receptacles, said cages adapted, respectively, to pass through the initial opening of the top of the tank and enter the interior of said tank, and to finally pass out through the terminal opening of the top, the serpentine slot accommodating the connecting medium between the cages and the carriages during the travel of the latter, means for causing the travel of the carriages along the trackway, means for introducing steam heat into the intermediate compartment, and a fan leading into the terminal compartment and adapted to force a blast of cool air around the several compartments.

11. In an apparatus for pasteurizing bottled liquids, the combination of a closed tank for containing a pasteurizing agent, said tank divided interiorly into a series of communicating compartments, and provided in its top and at the forward portion thereof with elongated openings arranged parallel with the respective side edges of the top, and said top also having a serpentine slot leading from one of said openings to the other, a trackway arranged above the tank and taking a serpentine course corresponding to the serpentine course of the slot, carriages adapted to travel on the trackway, cages suspended from the carirages and carrying the liquid containing receptacles, said cages adapted respectively, to pass through the initial opening of the top of the tank and enter the interior of said tank, and to finally pass out through the terminal opening of the top, the serpentine slot accommodating the connecting medium between the cages and the carriages during the travel of the latter, means for causing the travel of the carriages along the trackway, means for introducing steam heat into the intermediate compartment, and a suction pump at the forward end of the tank, adapted when operated to draw the pasteurizing agent from the initial compartment into the terminal compartment.

12. In an apparatus for pasteurizing bottled liquids, the combination of a closed tank for containing a pasteurizing agent, said tank divided interiorly into a series of communicating compartments, and provided in its top and at the forward portion thereof with elongated openings arranged parallel with the respective side edges of the top, said top also having a serpentine slot leading from one of said openings to the other, a trackway arranged above the tank and taking a serpentine course corresponding to the serpentine course of the slot, carriages adapted to travel on the trackway, cages suspended from the carriages and carrying the liquid containing receptacles, said cages adapted, respectively, to pass through the initial openings of the top of the tank and enter the interior of the tank, and to finally pass out through the terminal openings of the top, the serpentine slot accommodating the connecting medium between the cages and the carriages during the travel of the latter, means for causing the travel of the carriages along the trackway, means for introducing steam heat into the intermediate compartment, a fan leading into the terminal compartment and adapted to force a blast of cool air around the several compartments, and a suction pump arranged at the forward end of the tank, and adapted to draw the pasteurizing agent from the initial compartment into the terminal compartment.

13. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one of said openings to the other, a trackway arranged above the tank, the forward portion of said trackway being on a level plane and extending transversely over the forward portion of the tank, thence descending and continuing on a level plane in a serpentine course corresponding to the serpentine course of the slot, and finally extending upwardly at an incline corresponding to the initial decline and joining the forward level high portion of the track, carriages adapted to travel on the trackway, cages suspended from the carriages and carrying the liquid containing receptacles, said cages, respectively, passing through the initial opening of the top of the tank and entering the interior of said tank, and finally passing out through the terminal opening, the serpentine slot accommodating the connecting medium between the cages and the carriages, during the travel of the latter, and means for causing the travel of said carriages along the track.

14. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one of said openings to the other, and the interior of the tank divided into a series of longitudinal communicating compartments by longitudinal partitions extending partially the length of the tank, and further subdivided into transverse end compartments by transverse partitions, said end compartments being in communication with the outer side compartments, a trackway arranged above the tank and taking a serpentine course corresponding to the serpentine course of the slot, carriages traveling on the trackway, cages suspended from the carriages and carrying the liquid containing receptacles, said cages adapted to pass through the initial opening of the top of the tank and enter the interior of the tank, and to finally pass out through the terminal opening of the tank, the serpentine slot accommodating the connecting medium between the cages and the carriages during the travel of the latter, and means for causing the travel of the carriages along the trackway.

15. In an apparatus for pasteurizing bottled liquids, the combination of a closed tank for containing a pasteurizing agent, said tank provided in its top and at the forward portion thereof with elongated openings arranged parallel with the respective side edges of the top of the tank, and said top having a serpentine slot leading from one opening to the other, and the interior of the tank divided into a series of longitudinal communicating compartments by longitudinal partitions extending partially the length of the tank, and further subdivided into transverse end compartments by transverse partitions, said end compartments being in communication with the side compartments of the tank, a trackway arranged above the tank and taking a serpentine course corresponding to the serpentine course of the slot, carriages traveling on the trackway, cages suspended from the carriages and carrying the liquid containing receptacles, said cages adapted to pass through the initial opening of the top of the tank and entering the interior of said tank, and finally passing out of the tank through the terminal opening, the serpentine slot accommodating the connecting medium between said cages and the carriages, during the travel of the carriages, means for causing the travel of the carriages along the trackway, and a suction pump arranged in the forward transverse compartment of the tank, and adapted to suck the pasteurizing agent from the initial compartment into the terminal compartment.

16. In an apparatus for pasteurizing bottled liquids, the combination of a tank divided into communicating compartments, each compartment containing a body of the pasteurizing agent, the said several bodies being of different temperatures, and said tank having a serpentine slot in its upper side, an endless belt or conveyer outside of the tank and provided with a series of projecting arms or hangers extending through the slot, and carriers within the tank and connected to the projecting arms or hangers, said carriers being submerged in the pasteurizing agent.

17. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one of the openings to the other, a track arranged above the tank, the forward motion of said track being on a level plane and extending transversely over the forward portion of the tank, thence descending and continuing on a level plane in a serpentine course corresponding to the serpentine course of the slot, and finally extending upwardly at an incline corresponding to the initial decline, and joining the level forward high portion of the track, carriages each consisting of wheels and a connecting axle, with an arm depending from the axle, the said wheels adapted to travel on the trackway, cages for carrying the liquid containing receptacles, said cages having upwardly extending arms which are pivotally connected to the depending arms of the carriages, and said cages adapted, respectively, to pass through the initial opening of the top of the tank and enter the interior of said tank, and to finally pass out through the terminal opening, the serpentine slot accommodating the upwardly extending arms of the cages, during the travel of the carriages along the track, and means for causing the travel of said carriages along the track.

18. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one of said openings to the other, a track arranged above the tank, the forward portion of said track being on a level plane and extending transversely over the forward portion of the tank, thence descending and continuing on a level plane in a serpentine course corresponding to the serpentine course of the slot, and finally extending upwardly at an incline corresponding to the initial decline, and joining the level forward high portion of the track, carriages each consisting of a wheel and a connecting axle, with an arm depending from the axle, the said wheels adapted to travel on the track, cages for carrying the liquid containing receptacles, said cages having upwardly extending arms pivotally connected to the depending arms of the carriages, and said cages adapted, respectively, to pass through the initial opening of the top of the tank and to enter the interior of said tank, and to finally pass out through the terminal opening, the serpentine slot accommodating the upwardly extending arms of the cages, during the travel of the carriages along the track, means for causing the travel of said carriages on the track, and short auxiliary tracks arranged above the lower ends of the declines of the main track, said auxiliary tracks preventing up movement of the carriages upon said carriages reaching the foot of the decline.

19. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one opening to the other, and the interior of the tank divided into a series of longitudinal communicating compartments by longitudinal partitions extending partially the length of the tank, and further subdivided into transverse end compartments by transverse partitions, the end compartments being in communication with the outer side compartments, a trackway arranged above the tank and taking a serpentine course corresponding to the serpentine course of the slot, carriages traveling on the trackway, cages suspended from the carriages and carrying the liquid containing receptacles, said cages adapted to pass through the initial opening of the top and enter the interior of the tank, and to finally pass out of the tank through the terminal opening, the serpentine slot accommodating the connecting medium between said cages and the carriages, during the travel of the carriages, means for causing the travel of the carriages along the track, and a longitudinal partition arranged within the intermediate compartment of the tank, but of less length than said compartment, in order to form a deflector.

20. In an apparatus for pasteurizing bottled liquids, the combination of a closed tank for containing a pasteurizing agent, said tank provided in its top and at the forward portion thereof with elongated openings arranged parallel with the respective side edges of the top, and said top having a serpentine slot leading from one opening to the other, and the interior of the tank divided into a series of longitudinal communicating compartments by longitudinal partitions extending partially the length of the tank, and further subdivided into transverse end compartments by transverse partitions, said end compartments being in communication with the outer side compartments, a trackway arranged above the tank and taking a serpentine course corresponding to the serpentine course of the slot, carriages traveling on the trackway, cages suspended from the carriages and carrying the liquid containing receptacles, said cages adapted to pass through the initial opening of the top and to enter the interior of the tank, and to finally pass out of the tank through the terminal opening, the serpentine slot accommodating the connecting medium between said cages and the carriages, during the travel of the carriages, means for causing the travel of the carriages along the trackway, and longitudinally alined partitions arranged within the intermediate compartment, the inner ends of said partitions being separated, so as to leave a space between said ends.

21. In an apparatus for pasteurizing bottled liquids, the combination of a tank divided into compartments communicating with each other at their alternate ends and adapted to contain a body of the pasteurizing agent, a carrier for holding the liquid containing receptacles, means for moving the carrier in a submerged state through the different compartments, the body of pasteurizing agent in the initial compartment being heated, means for heating the body of agent in the next or intermediate compartment to a higher degree for pasteurizing purposes, and means for causing a circulation of the agent directly from the initial compartment into the third compartment.

22. In an apparatus for pasteurizing bottled liquids, the combination of a tank divided into compartments communicating with each other at their alternate ends and adapted to contain a body of the pasteurizing agent, a carrier for holding the liquid containing receptacles, means for moving the carrier in a submerged state through the different compartments, the body of pasteurizing agent in the initial compartment being heated, means for heating the body of agent in the next or intermediate compartment to a higher degree for pasteurizing purposes, means for cooling the agent in the third compartment, and means for causing a circulation of the agent directly from the initial compartment into the third compartment.

23. In an apparatus for pasteurizing bottled liquids, the combination of a tank divided into compartments communicating with each other at their alternate ends and adapted to contain a body of the pasteurizing agent, a carrier for holding the liquid containing receptacles, means for moving the carrier in a submerged state through the different compartments, the body of pasteurizing agent in the initial compartment being heated, means for heating the body of agent in the next or intermediate compartment to a higher degree for pasteurizing purposes, a circulating pump in the connection between the third and the first compartments for causing a circulation directly from the initial compartment into the third compartment.

24. In an apparatus for pasteurizing bottled liquids, the combination of a tank divided into compartments communicating with each other at their alternate ends and adapted to contain a body of the pasteurizing agent, a carrier for holding the liquid containing receptacles, means for moving the carrier in a submerged state through the different compartments, the body of pasteurizing agent in the initial compartment being heated, means for heating the body of agent in the next or intermediate compartment to a higher degree for pasteurizing purposes, means for causing a circulation of the agent directly from the initial compartment into the third compartment, and a fan located in such third compartment and directing a blast of air through the compartments in a direction opposite to that of the travel of the carriers.

In testimony whereof, I affix my signature, in presence of two witnesses.

SIMON VOLZ.

Witnesses:
A. L. MORSELL,
ANNA F. SCHMIDTBAUER.